US009335825B2

(12) United States Patent
Rautiainen et al.

(10) Patent No.: US 9,335,825 B2
(45) Date of Patent: May 10, 2016

(54) GESTURE CONTROL

(75) Inventors: Terhi Tuulikki Rautiainen, Vantaa (FI);
Ping Hui, British Columbia (CA); Risto Heikki Sakari Kaunisto, Espoo (FI);
Ilari Aleksi Teikari, Helsinki (FI); Jani Petri Juhani Ollikainen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 762 days.

(21) Appl. No.: 12/693,667

(22) Filed: Jan. 26, 2010

(65) Prior Publication Data

US 2011/0181509 A1    Jul. 28, 2011

(51) Int. Cl.
*G06F 3/01*    (2006.01)

(52) U.S. Cl.
CPC ............ *G06F 3/017* (2013.01); *G06F 3/011* (2013.01); *G06F 3/012* (2013.01)

(58) Field of Classification Search
CPC .......... G06F 3/017; G06F 3/011; G06F 3/012
USPC .................................................. 345/156–158
See application file for complete search history.

(56) References Cited

U.S. PATENT DOCUMENTS

| | | | | |
|---|---|---|---|---|
| 6,307,952 | B1* | 10/2001 | Dietz | 382/107 |
| 6,313,825 | B1* | 11/2001 | Gilbert | 345/156 |
| 2004/0243342 | A1 | 12/2004 | Rekimoto | 702/150 |
| 2005/0271254 | A1 | 12/2005 | Hougen | 382/104 |
| 2006/0040739 | A1* | 2/2006 | Wells | 463/37 |
| 2006/0161870 | A1 | 7/2006 | Hotelling et al. | 715/863 |
| 2007/0121097 | A1* | 5/2007 | Boillot | 356/28 |
| 2007/0130547 | A1* | 6/2007 | Boillot | 715/863 |
| 2007/0195997 | A1 | 8/2007 | Paul et al. | 382/104 |
| 2007/0197229 | A1 | 8/2007 | Kalliola et al. | 455/456.1 |
| 2008/0117094 | A1 | 5/2008 | Lindoff et al. | 342/109 |
| 2008/0134102 | A1* | 6/2008 | Movold et al. | 715/863 |
| 2008/0280642 | A1 | 11/2008 | Coxhill et al. | 455/556.1 |
| 2008/0294019 | A1 | 11/2008 | Tran | 600/301 |

(Continued)

FOREIGN PATENT DOCUMENTS

CA     2 495 014 A1    2/2004
CN     1531676 A    9/2004

(Continued)

OTHER PUBLICATIONS

J.F. Holzrichter et al., "Speech Articulator and User Gesture Measurements Using Micropower, Interferometric EM-Sensors", IEEE Instrumentation and Measurement Technology Conference, Budapest Hunrary, May 21-23, 2001, pp. 1942-1946.

(Continued)

*Primary Examiner* — Joseph Feild
*Assistant Examiner* — Saifeldin Elnafia
(74) *Attorney, Agent, or Firm* — Harrington & Smith

(57) ABSTRACT

An apparatus including: a radio transmitter configured to transmit radio signals that are at least partially reflected by a human body; one or more radio receivers configured to receive the transmitted radio signals after having been at least partially reflected by a human body of a user; a gesture detector configured to detect a predetermined time-varying modulation that is present in the received radio signals compared to the transmitted radio signals; and a controller configured to interpret the predetermined time-varying modulation as a predetermined user input command and change the operation of the apparatus.

23 Claims, 2 Drawing Sheets

(56) References Cited

U.S. PATENT DOCUMENTS

| | | | |
|---|---|---|---|
| 2009/0088204 A1 | 4/2009 | Culbert et al. | 455/556.1 |
| 2010/0289772 A1 | 11/2010 | Miller | 345/175 |

FOREIGN PATENT DOCUMENTS

| | | |
|---|---|---|
| EP | 1 837 741 A2 | 9/2007 |
| GB | 2 423 808 A | 9/2008 |
| JP | 2007052654 A | 1/2007 |
| WO | WO-0116554 A2 | 3/2001 |
| WO | WO 2008/001202 A2 | 1/2008 |
| WO | WO 2008/003096 A2 | 1/2008 |
| WO | WO 2008/110895 A2 | 9/2008 |
| WO | WO 2009/010312 A1 | 1/2009 |
| WO | WO 2009/024881 A1 | 2/2009 |
| WO | WO 2009/096643 A1 | 8/2009 |
| WO | WO-2009/096644 A1 | 8/2009 |
| WO | WO 2009/0122193 A1 | 10/2009 |

OTHER PUBLICATIONS

P. Shui et al., "Range-Spread Target Detection Based on Cross Time-Frequency Distribution Features of Two Adjacent Received Signals", IEEE Transactions on Signal Processing, vol. 57, No. 10, Oct. 2009.

D. Parker et al., "Phased Arrays—Part I: Theory and Architectures", IEEE Transactions on Microwave Theory and Techniques, vol. 50, No. 3, Mar. 2002.

D. Parker et al., "Phased Arrays—Part II: Implementations, Applications, and Future Trends", IEEE Transactions on Microwave Theory and Techniques, vol. 50, No. 3, Mar. 2002.

T. Chu et al., "A CMOS UWB Camera with 7X7 Simultaneous Active Pixels", University of Southern California, Los Angeles, CA, 2008 IEEE International Solid State Circuits Conference, 978-4244-2011-7/08.

Pocket Radar, http://pocketradar.com/how-it-works.html—Feb. 3, 2011.

G. Raes, "A Radar Based Gesture Controlled Instrument Using MIDI", Post-Doctoral Researcher, Ghent University College and Logos Foundation, 2004, http://www.logosfoundation.org/ii/picradar.html [Dec. 17, 2009 5:39:26 PM].

G. Raes, "A Doppler Radar Based Gesture Measurement System Capable of Delivering Positional Information", 2009 Post-Doctoral Researcher, Ghent University College and Logos Foundation, http://www.logosfoundation.org/ii/dopplerFMradar [Feb. 3, 2011].

Gesture-Sensing Radars Project, MIT Media Laboratory, http://www.media.mit.edu/resenv/Radar/index.html.[Dec. 18, 2009 9:35:26 AM].

\* cited by examiner

GESTURE CONTROL

FIELD OF THE INVENTION

Embodiments of the present invention relate to controlling an apparatus using gestures.

BACKGROUND TO THE INVENTION

It would be desirable to control an apparatus without having to touch it and without having to use a remote control device.

BRIEF DESCRIPTION OF VARIOUS EMBODIMENTS OF THE INVENTION

According to various, but not necessarily all, embodiments of the invention there is provided an apparatus comprising: one or more radio transmitters configured to transmit radio signals that are at least partially reflected by a human body; one or more radio receivers configured to receive the transmitted radio signals after having been at least partially reflected by a human body of a user; a gesture detector configured to detect a predetermined time-varying modulation that is present in the received radio signals compared to the transmitted radio signals; and a controller configured to interpret the predetermined time-varying modulation as a predetermined user input command and change the operation of the apparatus.

According to various, but not necessarily all, embodiments of the invention there is provided a gesture recognition engine for a gesture controlled user interface comprising: a radio receiver for receiving radio signals after having been at least partially reflected by a human body gesture; a gesture detector configured to detect a predetermined time-varying modulation that is present in the received radio signals compared to a radio signals before reflection; and an interface for providing the detected predetermined time-varying modulation as an output.

According to various, but not necessarily all, embodiments of the invention there is provided a method comprising: transmitting radio signals that are at least partially reflected by a human hand; receiving the transmitted radio signals after having been at least partially reflected by a gesturing human hand; detecting a predetermined time-varying modulation, characterizing the gesture, that is present in the received radio signals compared to the transmitted radio signals; and changing the operation of an apparatus in dependence upon the predetermined time-varying modulation.

According to various, but not necessarily all, embodiments of the invention there is provided an apparatus comprising: a radio transmitter configured to transmit radio signals that are at least partially reflected by a human body; one or more radio receivers configured to receive the transmitted radio signals after having been at least partially reflected by a human body of a user; a gesture detector configured to detect a Doppler frequency shift over time that is present in the received radio signals compared to the transmitted radio signals; and a controller configured to interpret the Doppler frequency shift over time as a predetermined user input command and change the operation of the apparatus.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

Figure 1:
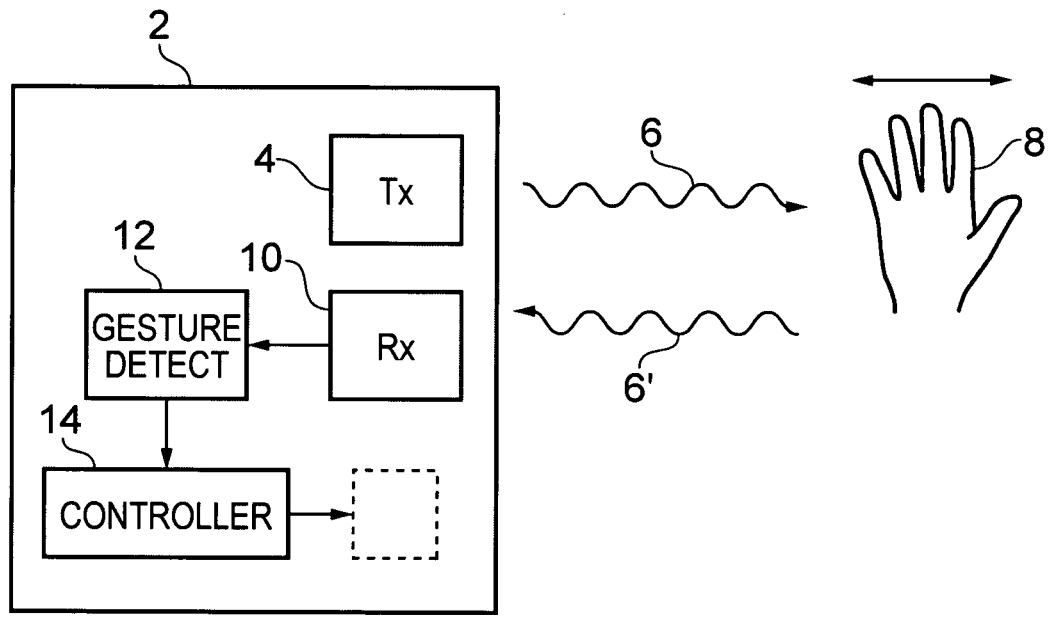
FIG. 1 schematically illustrates an apparatus that uses radar to detect gestures.

The Figures illustrate an apparatus 2 comprising: at least one radio transmitter 4 configured to transmit radio signals 6 that are at least partially reflected by a human body 8; one or more radio receivers 10 configured to receive the transmitted radio signals 6' after having been at least partially reflected by a human body 8 of a user; a gesture detector 12 configured to detect a predetermined time-varying modulation that is present in the received radio signals 6' compared to the transmitted radio signals 6; and a controller 14 configured to interpret the predetermined time-varying modulation as a predetermined user input command and change the operation of the apparatus 2.

The apparatus 2 is configured to use radar technology to detect a gesture, such as a hand gesture, and to interpret the detected gesture as a user input command. The user is therefore able to control the operation of the apparatus 2 without touching the apparatus 2.

Typically the radio waves would be microwaves or millimeter waves which are capable of penetrating clothing etc. A user is therefore able to control the operation of the apparatus 2 using a gesture even when the apparatus is stowed out of sight in a pocket or handbag, for example.

The gesture is typically a non-touching gesture that is a gesture that does not touch the apparatus 2 itself but which involves the movement of all or part of a body. A gesture may be a hand gesture which involves the movement of all or part of the hand.

Referring to FIG. 1, there is schematically illustrated an apparatus 2 comprising: a radio transmitter 4; a radio receiver 10; a gesture detector 12; and a controller 14.

The apparatus 2 may be any apparatus that it is desirable to control by user input and in particular non-touching gestures. In some but not necessarily all embodiments, the apparatus 2 may be a hand portable apparatus 2 that is sized to fit in the palm of the hand or a jacket pocket. It may, for example, be a personal electronic device such as a music player, a video player, a mobile cellular telephone, an eBook reader etc.

The radio transmitter 4 is configured to transmit radio signals 6 that are at least partially reflected by a human body 8. The radio signals may, for example, be microwave signals. The apparatus may, in some embodiments, be configured to additionally use the radio transmitter 4 for wireless data transmission in addition to the described radar gesture detection.

The radio receiver 10 is configured to receive radio signals 6' that have been transmitted by the radio transmitter 4 and at least partially reflected by, for example, a hand 8 of a user when it is making a non-touching gesture. The radio receiver 10 in this example is fixed relative to the apparatus 2 and does not move or scan in use.

The reflection of the radio signals 6 off a moving hand 8 imparts a modulation to the radio signals. A characteristic or characteristics of the transmitted radio signals vary in time as the gesture varies in time.

The gesture detector 12 is configured to detect a predetermined time-varying modulation that is present in the received radio signals 6' compared to the transmitted radio signals 6. There may be a number of time-varying modulations apparent in the received signal and at least some will be as a result of external interference. The gesture detector 12 is configured to discriminate between the generality of time-varying modulations to identify the predetermined time-varying modulations that correspond to predetermined gestures. The gesture detector may, for example, determine from the time varying characteristic or characteristics of the transmitted radio signal one or more time variable parameters that parameterize the gesture that caused the time-varying modulation. The parameters may include, for example, kinematic parameters of the gesture such as distance, speed, direction etc The controller 14 is configured to interpret the predetermined time-varying modulation as a predetermined user input command and change the operation of the apparatus 2. The operation of the apparatus 2 is therefore changed without the user touching the apparatus as a result of the gesture.

The controller 14 may associate in a look-up table predetermined time-varying modulations with predetermined user input commands. When the controller receives a predetermined time varying command resulting from a predetermined gesture it uses the look-up table to determine the appropriate user input command in response to the gesture. The parameterization of the predetermined time-variable modulations enables the identification of multiple different gestures.

The associations between predetermined time-varying modulations and predetermined user input commands could be stored while manufacturing the apparatus 2 or transferred to the apparatus 2 using a storage media. In some embodiments, it may also be possible to allow user programming of gestures and the response to those gestures. For example, the apparatus 2 may have a learning mode in which a user teaches various gestures to the apparatus 2 and then program the apparatus 2 to create associations between predetermined time-varying modulations for those gestures and user-defined user input commands.

A lexicon can be formed where the individual discrete gestures are 'words' and a grammar may be specified that defines the meaningful combinations of words (sentences). Each word and each sentence can produce a different user input command, if required.

One user input command may change an application mode or function. Thus a particular gesture may reject an incoming telephone call and another gesture may answer the call. The user may be able to control the apparatus 2 directly without the need for a graphical user interface or a display at the apparatus 2.

Another user input command may control a user interface of the apparatus 2 and in particular user output devices such as a loudspeaker or a display, for example. The user interface may, for example, be controlled to change how content is presented to a user.

For example, a gesture may increase audio output volume and another gesture may decrease audio output volume. As the user input commands are the opposite of each other, it may be preferable if the gestures that effect those commands were also in an opposite sense to each other.

For example, a gesture may zoom-in on information displayed on a display and another gesture may zoom-out. As the user input commands are the opposite of each other, it may be preferable if the gestures that effect those commands were also in an opposite sense to each other.

For example, a gesture may scroll information in a display up (or left) and another gesture may scroll information in a display down (or right). As the user input commands are the opposite of each other, it may be preferable if the gestures that effect those commands were also in an opposite sense to each other.

It is stated above that the reflection of the radio signals 6 off a moving hand 8 imparts a modulation to the radio signals—a characteristic or characteristics of the transmitted radio signals that varies in time as the gesture varies in time. This is illustrated now by way of example:

In a first example, if the hand 8 is moving towards the radio receiver 10 the Doppler effect will result in an upwards frequency shift for the radio signals 6' (compared to the radio signals 6) that is proportional to the velocity of the hand towards the radio receiver 10 and if the hand 8 is moving away from the radio receiver 10 the Doppler effect will result in a downwards frequency shift for the radio signals 6' that is proportional to the velocity of the hand away from the radio receiver 10.

The gesture detector 12 comprises a Doppler radar detector configured to determine a frequency difference between the carrier frequency of received radio signals 6' and the carrier frequency of transmitted radio signals 6. The Doppler radar does not have to be on continuously and may be pulsed to save power. The gesture detector 12 determines from the time varying characteristic (frequency) of the transmitted radio signal one or more time variable parameters (speed, direction) that parameterize the gesture that caused the time-varying modulation.

In another example, which may be used in combination with the first example, if the transmission signals are modulated at transmission so that they have a periodic time signature, the Doppler effect also causes a frequency shift in the periodic time signature. The time signature may, for example, be a periodic variation in amplitude (pulsed Doppler or pulsed Ultra wideband) or a periodic variation in frequency (Frequency Modulated Continuous wave). If the hand 8 is moving towards the radio receiver 10 the period between signatures decreases and if the hand 8 is moving away from the receiver the period between signatures increases.

The gesture detector 12 comprises circuitry configured to measure the period between signatures. The gesture detector 12 may determine from the time varying characteristic (period) of the transmitted radio signal one or more time variable parameters (speed, direction) that parameterize the gesture that caused the time-varying modulation.

The gesture detector 12 may additionally comprise circuitry configured to measure the interval between the transmission of a signature and its reception. The gesture detector 12 determines from the time varying characteristic (interval) of the transmitted radio signal one or more time variable parameters (distance) that parameterize the gesture that caused the time-varying modulation. This may conveniently be used as a 'gate' i.e. to accept as valid only gestures (and their time varying frequency shift) that are within a certain range from the apparatus 2.

In another example, which may be used in combination with the first example, if the transmission signals are transmitted with a known power, the power of the received reflected signals may give an indication of the range or distance of the gesture, or the size of the reflecting object. The gesture detector 12 comprises circuitry configured to measure the power difference between transmission and reception. The controller 14 may determine whether a gesture is valid based on the received power. For example, the controller 14 may convert the power difference to a distance, or to the size of the reflecting object generating the gesture. The distance or size is not typically used by itself as a parameter but it may be used to determine when other parameters such as speed and direction are valid. For example, there may be a valid range of distances (i.e. greater than a minimum distance but less than a maximum distance) for valid gestures or for the initiation and/or termination of a valid gesture.

WO 01/16554 "SSB pulse Doppler sensor and active reflector system" discloses how rotation can be detected using I/Q demodulated Doppler radars. Rotation could therefore additionally be used as a parameter for defining a gesture.

Figure 2:
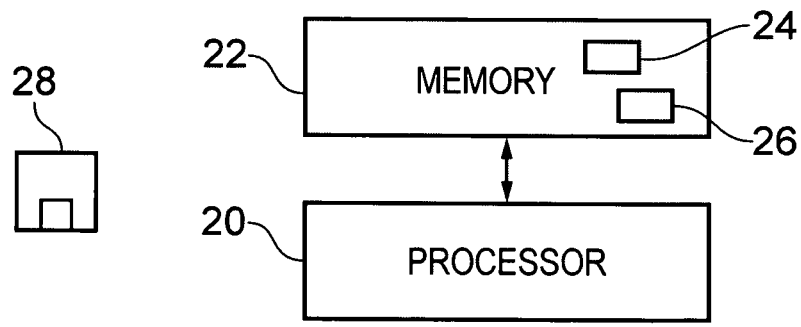
FIG. 2 illustrates a suitable platform for providing a gesture detector and a controller using software.

FIG. 2 illustrates a suitable platform for providing the gesture detector 12 and the controller 14 using software.

The gesture detector 12 and/or the controller 14 may be implemented using instructions that enable hardware functionality, for example, by using executable computer program instructions in a general-purpose or special-purpose processor that may be stored on a computer readable storage medium (disk, memory etc) to be executed by such a processor.

A processor 20 is configured to read from and write to the memory 22. The processor 20 may also comprise an output interface via which data and/or commands are output by the processor 20 and an input interface via which data and/or commands are input to the processor 20.

The memory 22 stores a computer program 24 comprising computer program instructions that control the operation of the gesture detector 12 and possibly the apparatus 2 when loaded into the processor 20 and/or stores a computer program 26 comprising computer program instructions that control the operation of the controller 14 and possibly the apparatus 2 when loaded into the processor 20.

Figure 6:
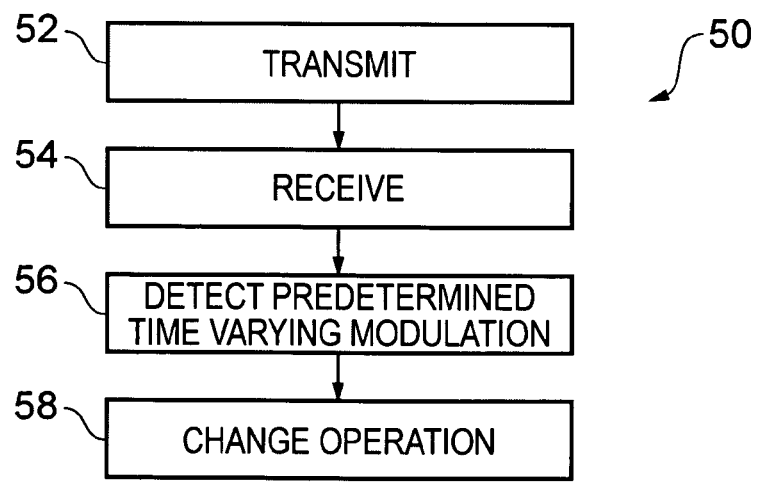
FIG. 6 schematically illustrates a method.

The computer program instructions provide the logic and routines that enables the apparatus to perform the methods illustrated in FIG. 6. The processor 20 by reading the memory 22 is able to load and execute the computer program 24, 26.

The computer program(s) may arrive at the apparatus 2 via any suitable delivery mechanism 28. The delivery mechanism 28 may be, for example, a computer-readable storage medium, a computer program product, a memory device, a record medium such as a CD-ROM or DVD, an article of manufacture that tangibly embodies the computer program. The delivery mechanism may be a signal configured to reliably transfer the computer program over the air or via an electrical connection. The apparatus 2 may propagate or transmit the computer program as a computer data signal.

Although the memory 22 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Thus the apparatus 2 may comprise at least one processor 20 and at least one memory 22 including computer program code 24, the at least one memory 22 and the computer program code 24 configured to, with the at least one processor provide the gesture detector 12.

Thus the apparatus 2 may comprise at least one processor 20 and at least one memory 22 including computer program code 26, the at least one memory 22 and the computer program code 26 configured to, with the at least one processor provide the controller 14.

The gesture detector 12 and the controller 14 may be provided by the same software application or by different software applications 24, 26 concurrently running on the same processor or processors.

Figure 3:
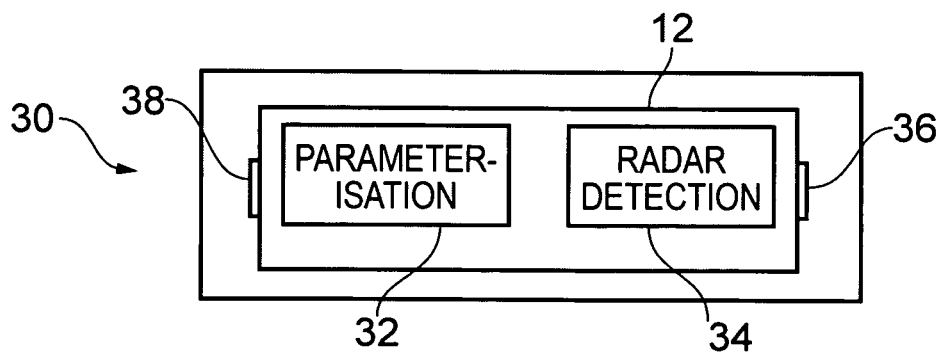
FIG. 3 schematically illustrates a gesture recognition engine.

FIG. 3 schematically illustrates a gesture recognition engine 30 for a gesture controlled user interface. The engine 30 comprises: an input interface 36 for connection to a radio receiver 10 for receiving radio signals; a gesture detector 12 configured to detect a predetermined time-varying modulation that is present in the received radio signals compared to reference radio signals; and an output interface 38 for providing the detected predetermined time-varying modulation as an output. It operates in the same manner as the gesture detector 12 described with reference to FIG. 1.

The time-varying modulation that is present in the received radio signals 6' compared to the reference (transmitted) radio signals 6 is characterized by the radar detector 34. If Doppler radar is used, the characterization may be a frequency shift between the received signals and the transmitted signals.

Figure 4:
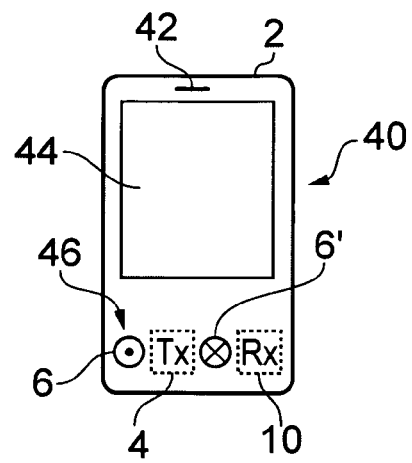
FIG. 4 schematically illustrates an exterior of an apparatus.

The parameterization block 32 may determine from the time varying characteristic or characteristics one or more time variable parameters that parameterize the gesture that caused the time-varying modulation. The parameters may be, for example, kinematic parameters of the gesture such as distance, speed, direction etc The engine 30 may be integrated on a chip set and/or a module. FIG. 4 schematically illustrates an exterior of an apparatus 2. The apparatus 2 in this embodiment is a portable apparatus that has a front face 46 comprising a user interface. The user interface comprises an audio output port 42 and a display 44. The apparatus 2 as illustrated in FIG. 1 comprises a radio transmitter 4 and a radio receiver 10. However, as these are generally housed within the exterior of the apparatus 2 and are not visible at the exterior they are illustrated using dotted lines. In this example, the radio transmitter 4 is configured to produce a directed transmission in which the radio signals predominantly travel outwardly away from and normally to the front face 46 of the apparatus 2. The reflected radio signals 6' travel inwardly towards the front face 46.

In this and other embodiments, the controller 14 (not illustrated in FIG. 4) may be configured to maintain a correspondence between the time varying nature of the input command and the time varying nature of modulation.

The controller 14 may be configured to provide a slowly varying and apparently analogue control when the gesture detector 12 detects a slowly moving continuous gesture. For example, if a hand gesture involved moving a hand slowly towards the front face 46, the apparently analogue control may involve slowly reducing the volume of an audio output. For example, if a hand gesture involved moving a hand slowly away from the front face 46, the apparently analogue control may involve slowly increasing the volume of an audio output. Similar control may alternatively be provided instead for zooming in and out or scrolling, for example.

The controller 14 may be configured to provide a binary two-state control when the gesture detector 12 detects a fast moving gesture. For example, if a hand gesture involved moving a hand quickly towards the front face 46, the binary control may involve muting the volume of an audio output. For example, if a hand gesture involved moving a hand quickly away from the front face 46, the binary control may involve exiting a currently running application.

Figure 5:
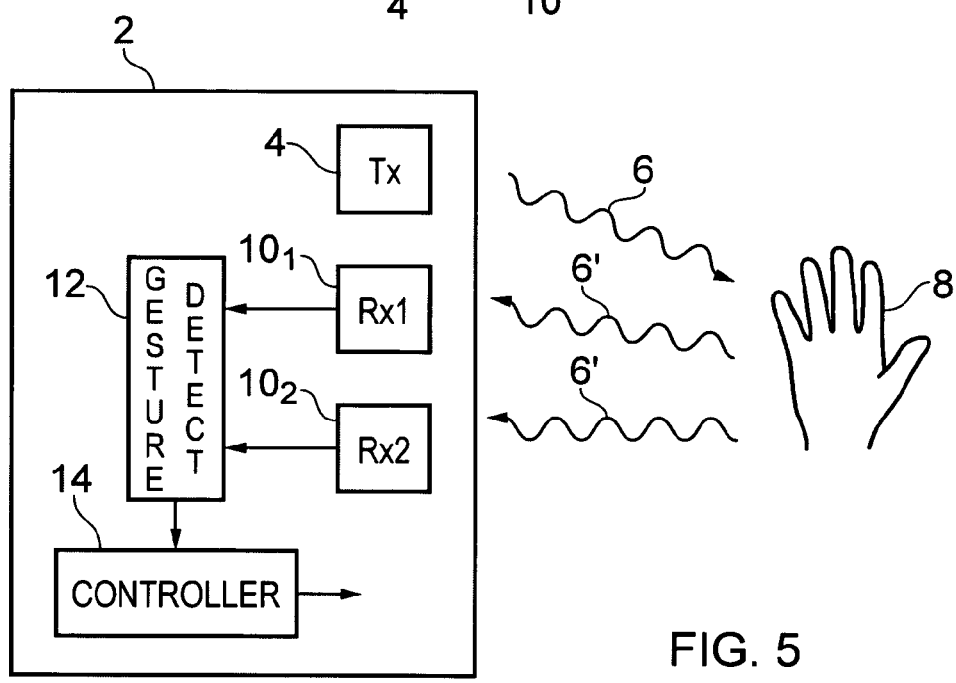
FIG. 5 schematically illustrates an alternative embodiment of the apparatus.

FIG. 5 schematically illustrates an alternative embodiment of the apparatus 2 that uses reception diversity. There are a plurality of radio receivers 10. Each of the radio receivers 10 receives the radio signals 6' reflected off the gesturing hand 8. The gesture detector 12 is configured to detect separately, for each of the plurality of receivers 10, a predetermined time-varying modulation that is present in the received radio signals compared to the transmitted radio signals. The controller 14 is configured to interpret the combination of predetermined time-varying modulations associated with the respective radio receivers as a predetermined user input command and change the operation of the apparatus.

For example, the gesture detector 12 may parameterize each of the predetermined time-varying modulations into kinematic parameters such as distance, direction, speed etc. The controller 14 may use a knowledge of the relative positions of the radio receivers 10 and the kinematic parameters determined for each receiver to resolve the position and velocity of the hand in two or three dimensions. This may, for example, enable the disambiguation of a clockwise rotating gesture from an anti-clockwise rotating gesture. The algorithms for trilateration and angle-of-arrival are well documented in the available literature and may be used to position the hand at each moment in time. In this way, quite complex gestures that involve movement in three dimensions may be detected and used as user input commands.

In this multiple-receiver configuration, each radio receiver 10 can point at the same angle or at different angles/directions.

FIG. 6 schematically illustrates a method 50 comprising:
at block 52, transmitting radio signals 6 that are at least partially reflected by a human hand or part thereof 8;
at block 54, receiving the transmitted radio signals 6' after having been at least partially reflected by a gesturing human hand 8;
at block 56, detecting a predetermined time-varying modulation, characterizing the gesture, that is present in the received radio signals 6' compared to the transmitted radio signals 6; and
at block 58, changing the operation of an apparatus 2 in dependence upon the predetermined time-varying modulation.

The method may also comprise determining one or more kinematic parameters that parameterize a gesture that causes the predetermined time-varying modulation, as described above. The method may also comprise other features that have been described previously with respect to operation of the apparatus 2.

There follows an example an implementation example for the method utilizing velocity information (speed and direction of movement) expressed in pseudocode:
1) Start playing music, and turn on radar
2) Gesture detector 12 reads radar input from radio receiver 10
3) Controller 14 adds the radar velocity input to a data buffer, and calculates mean value mean(buffer) of the inputs in data buffer. Buffering is not mandatory but ensures a smoother operation.
4) Increase volume, if
   a) the absolute mean value abs(mean(buffer)) exceeds a pre-defined threshold, and
   b) the sign of mean(buffer) indicates "gesture away", and
   c) we are not playing music at maximum volume yet 5) Decrease volume, if
   a) the absolute mean value abs(mean(buffer)) exceeds a pre-defined threshold, and
   b) the sign of mean(buffer) indicates "gesture towards", and
   c) we are not playing music at minimum volume yet
6) Go back to 2)

The volume step by which the volume is changed may be made speed dependent: the larger the speed, the larger the volume step. This enables for example a change in the volume from 100% to 0% (=mute) either by slower motion of the hand through the operation range of the radar, or a fast slam over a short time period.

Currently this example method utilizes basic Doppler shift information (velocity and direction of motion), but it does not take into account any distance information. However, when the distance or range information is available, steps 4 and 5 can further be refined to accommodate desired gesture inputs and reject undesired ones based on distance. In that case we can set an additional condition for triggering the volume change based on distance. Alternatively the radar can be set already in step 2 to read inputs within certain distance range.

As used here 'module' refers to a unit or apparatus that excludes certain parts/components that would be added by an end manufacturer or a user.

The blocks illustrated in the FIG. 6 may represent steps in a method and/or sections of code in the computer program. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

The controller 14 may be configured to determine when a gesture detected by the gesture detector 12 is valid or even when the radar detection is turned on. An external event, such as an alarm, alert or other event may enable the controller 14. The enabled controller then enables the radio transmitter, radio receiver and gesture detector and is itself enabled to interpret predetermined time-varying modulation detected by the gesture detector 12 as a predetermined user input command and change the operation of the apparatus 2. Different gestures may produce different user input commands This enablement, for gesture detection, may last while the external event is occurring or for a predetermined duration after the event starts.

For example, when there is an incoming telephone call, in one embodiment the controller 14 turns the radar on and it is configured to interpret predetermined time-varying modulation detected by the gesture detector 12 as a predetermined user input command and change the operation of the apparatus 2. Different gestures may produce different user input commands which may, for example, answer the call, cancel the call or divert the call to, for example, voicemail. This enablement, for gesture detection, may last while the external event is occurring or for a predetermined duration after the event starts.

As another example, when there is an alarm alert, in one embodiment the controller 14 turns the radar on and it is configured to interpret predetermined time-varying modulation detected by the gesture detector 12 as a predetermined user input command and change the operation of the apparatus 2. Different gestures may produce different user input commands which may, for example, silence the alarm permanently or temporarily silence the alarm. This enablement, for gesture detection, may last while the external event is occurring or for a predetermined duration after the event starts.

As another example, in a camera application when a user activates a 'remote control' mode, the controller 14 turns the radar on and it is configured to interpret predetermined time-varying modulation detected by the gesture detector 12 as a predetermined user input command and change the operation of the apparatus 2. A large scale gesture may produce a user input command which may, for example, take the picture after a very short delay or when the absence of movement or gestures has been detected. Alternatively, the absence of movement or gestures may produce a user input command which may, for example, take the picture after a very short delay. In a further embodiment, a large scale gesture may produce a user input command which may, for example, cause the camera to produce an audible sound to attract attention, followed by a visual indicator to draw the subjects' gaze, followed by taking the picture when the absence of movement or gestures has been detected.

In other embodiments, a non-touching gesture may be combined with pressing one or more additional user input commands that 'primes' the apparatus to detect the gesture. The additional user input command may be, for example, an audio input command or a touch-based input command such as actuating a button. The additional user input command may be carried out simultaneously with the gesture or the gesture may need to follow within a time window immediately following the additional user input command. The additional user input command is a simple way of filtering out unwanted gestures.

For example, in a map application pressing a certain button while moving a hand towards the device could be interpreted as zoom in, whereas pressing the same button and moving the hand away could be interpreted as zoom out. Pressing a different button while moving a hand towards the device could scroll the screen up, whereas pressing the same button and moving the hand away from the device would cause scrolling the screen down. Pressing a third button with the same gesture would scroll screen left etc. The buttons could be part of a touch screen or discrete buttons.

Referring to FIG. 1, there could be an embodiment where there is a connection between the radio transmitter 4 and the radio receiver 10. In addition, there could be feedback from the controller 14 to the radio transmitter 4 and radio receiver 10 for adjusting their parameters such as transmit power, frequency, receiver sensitivity, etc.

Referring to FIG. 1, although a single radio transmitter 4 is described. It should be appreciated that there may, in other embodiments, transmission diversity using multiple radio transmitters 4 or multiple antennas for a single radio transmitter 4. These sources of radio signals could be placed pointing at different directions, e.g. one for the front face and one for the back cover so that we can select the relevant directional source of radio signals for different gesturing applications, or even use them at the same time.

Although in the preceding description, a human user gesture has been detected as a user input command, in other embodiments the gesture may be performed by a non-human such as animals, robots or machines.

Although in the preceding description, a gesture has been performed as an 'external gesture' in which, for example, a human hand is actively moved relative to a stationary apparatus 2, it should be understood that a gesture may also be an 'integrated gesture' in which the apparatus 2 is actively moved relative to an environment that is detectable by radar. The apparatus 2 may be hand portable and the environment may be provided, at least in part, by a user's body.

Referring to FIG. 1, the radio transmitter 4 may, in some embodiments, be configured to transmit at multiple different center frequencies and multiple frequency bands. Different countries allow different frequencies to be used for radar purposes. The apparatus 2 may be configured to operate at multiple frequencies and, when incorporated with a mobile cellular telephone could determine and use suitable frequencies based on the country information the cellular telephone receives from a cellular network.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
at least one processor; and
at least one memory including computer program code, where the at least one memory and the computer program code are configured, with the at least one processor, to cause the apparatus to at least:
   detect that an application is being started on the apparatus;
   in response to the application being started on the apparatus, turn on a continuous wave doppler radar at the apparatus and transmit radio signals that comprise the continuous wave doppler radar, wherein the radio signals are at least partially reflected by a human body of a user of the apparatus;
   receive the transmitted radio signals after having been at least partially reflected by a gesture by the human body of the user;
   detect in the received radio signals a predetermined time-varying modulation caused by the gesture by the human body of the user and that is present in a modulation of the received radio signals as compared to a modulation of the transmitted radio signals, wherein detecting the predetermined time-varying modulation of the received signal comprises detecting a doppler frequency shift in the continuous wave doppler radar of the radio signals transmitted from the apparatus, wherein the doppler frequency shift comprises a frequency modulated continuous wave variation caused by the gesture by the human body of the user;
   associate the detected predetermined time-varying modulation with a predetermined user input command; and
   based on the associated predetermined user input command control at least one operation of the application on the apparatus.

2. An apparatus as claimed in claim 1, wherein the apparatus is a hand portable apparatus.

3. An apparatus as claimed in claim 1, wherein the at least one memory including the computer program code is configured with the at least one processor to cause the apparatus to determine from the predetermined time-varying modulation of the received radio signal one or more kinematic parameters that parameterize the gesture by the human body that caused the predetermined time-varying modulation including at least a speed or velocity parameter.

4. An apparatus as claimed in claim 3, wherein the at least one memory including the computer program code is configured with the at least one processor to cause the apparatus to detect the one of more kinematic parameters to resolve at least one of a position and a velocity of the gesture in two or three dimensions.

5. An apparatus as claimed in claim 4, wherein the at least one memory including the computer program code is configured with the at least one processor to cause the apparatus to provide slowly varying analogue control when a slowly moving continuous gesture is detected.

6. An apparatus as claimed in claim 3, wherein a separate user actuation in addition to the gesture is required to enable the controlling the at least one operation of the apparatus in response to the gesture.

7. An apparatus as claimed in claim 4, wherein the at least one memory including the computer program code is configured with the at least one processor to cause the apparatus to provide binary two-state control when a fast moving gesture is detected.

8. An apparatus as claimed in claim 1, wherein when the time-varying modulation of the received signal comprises the doppler frequency shift, the predetermined time-varying modulation is characterized by a doppler frequency shift between the received signals and the transmitted signals.

9. An apparatus as claimed in claim 1, wherein the at least one memory including the computer program code is configured with the at least one processor to cause the apparatus to maintain in a memory of the apparatus a correspondence between a time varying nature of the predetermined user input command and a time varying nature of the predetermined time-varying modulation, and to use the maintained correspondence in the memory to associate the detected predetermined time-varying modulation caused by the gesture by the human body of the user with the predetermined user input command.

10. An apparatus as claimed in claim 1, wherein the application is a music player application, wherein the controlling the at least one operation of the application comprises controlling at least a volume of the music player application.

11. An apparatus as claimed in claim 10, wherein the at least one memory including the computer program code is configured with the at least one processor to cause the apparatus:
for a case the predetermined time-varying modulation is caused by the gesture moving towards a face of the apparatus at a velocity that does not exceed a pre-defined threshold, to reduce the volume of the music player application,
for a case the predetermined time-varying modulation is caused by the gesture moving away from a face of the apparatus at a velocity that does not exceed a pre-defined threshold, to increase the volume of the music player application,
for a case the predetermined time-varying modulation is caused by the gesture moving towards a face of the apparatus at a velocity that exceeds a pre-defined threshold, to mute the volume of the music player application, and
for a case the predetermined time-varying modulation is caused by the gesture moving away from a face of the apparatus at a velocity that exceeds a pre-defined threshold, to exit the music player application.

12. An apparatus as claimed in claim 1, wherein the controlling the at least one operation of the application comprises the at least one memory including the computer program code is configured with the at least one processor to cause the apparatus to change any one or more of: display zoom-in, display zoom-out, display scroll-up, display scroll-down, display scroll-right, display scroll-left, a telephone call state, a camera capture state, an audio output muting, and an application run status.

13. An apparatus as claimed in claim 1, wherein the apparatus has a front face and wherein the at least one memory including the computer program code is configured with the at least one processor to cause the apparatus to:
transmit the radio signals at least substantially normally to the front face, and
receive the radio signals that are reflected towards the front face, wherein the gesture by the human body of the user is required to be moving towards the front face of the apparatus to cause the doppler radar frequency modulated continuous wave variation to change the at least one operation of the application on the apparatus.

14. An apparatus as claimed in claim 1, wherein the apparatus comprises a plurality of radio receivers and wherein the at least one memory including the computer program code is configured with the at least one processor to cause the apparatus to:
detect, for each of the plurality of receivers, the predetermined time-varying modulation that is present in a modulation of the received radio signals compared to the modulation of the transmitted radio signals, and
interpret a combination of predetermined time-varying modulations associated with the respective radio receivers as the predetermined user input command and control the at least one operation of the apparatus.

15. An apparatus as claimed in claim 1, wherein the at least one memory including the computer program code is configured with the at least one processor to cause the apparatus to operate with transmission diversity.

16. An apparatus as claimed in claim 1, wherein the apparatus is user programmable to predetermine time-varying modulations for detection in the received radio signals.

17. An apparatus comprising:
a controller configured to detect that an application is being started on the apparatus,
and in response to the application being started on the apparatus turn on a continuous wave doppler radar at the apparatus;
a radio receiver configured to receive radio signals that comprise the continuous wave doppler radar after having been at least partially reflected by a gesture by a human body of a user of the apparatus;
a gesture detector configured to detect in the received radio signals a predetermined time-varying modulation caused by the gesture by the human body of the user and that is present in a modulation of the received radio signals as compared to a modulation of the radio signals before the reflection, wherein detecting the predetermined time-varying modulation of the received signal comprises detecting a doppler frequency shift in the transmitted continuous wave doppler radar from the apparatus, wherein the doppler frequency shift comprises a frequency modulated continuous wave variation caused by the gesture by human body of the user;
an interface for providing the detected predetermined time-varying modulation as an output; and
the controller configured to associate the detected predetermined time-varying modulation with a predetermined user input command, and based on the associated predetermined user input command control at least one operation of the application on the apparatus.

18. The apparatus as claimed in claim 17, wherein the gesture detector is configured to determine, with respect to the gesture by the human body that provides the received radio signals, one or more kinematic parameters that parameterize the gesture by the human body that caused the time-varying modulation including at least a speed or velocity parameter.

19. A method comprising:
    detecting, by an apparatus, that an application is being started on the apparatus, and in response to the application being started on the apparatus turning on a continuous wave doppler radar at the apparatus;
    transmitting, by the apparatus, radio signals that comprise the continuous wave doppler radar, wherein the radio signals are at least partially reflected by a human hand;
    receiving, by the apparatus, the transmitted radio signals after having been at least partially reflected by a gesturing human hand;
    detecting, by the apparatus, a predetermined time-varying modulation, characterizing the gesture, that is present in a modulation of the received radio signals compared to a modulation of the transmitted radio signals, wherein detecting the predetermined time-varying modulation of the received signal comprises detecting a doppler frequency shift in the transmitted radio signals based on the continuous wave doppler radar, wherein the doppler frequency shift comprises a frequency modulated continuous wave variation caused by the gesturing human hand; and
    controlling, by the apparatus, an operation of the application on the apparatus in dependence upon the predetermined time-varying modulation.

20. A method as claimed in claim 19 further comprising: determining one or more kinematic parameters that parameterize a gesture that causes the predetermined time-varying modulation including at least a speed or velocity parameter.

21. The method as claimed in claim 19, wherein the application is a music player application, wherein the controlling the at least one operation of the application comprises controlling at least a volume of the music player application.

22. The method as claimed in claim 21, comprising:
    for a case the predetermined time-varying modulation is caused by the gesture moving towards a face of the apparatus at a velocity that does not exceed a pre-defined threshold, reducing the volume of the music player application, and
    for a case the predetermined time-varying modulation is caused by the gesture moving away from a face of the apparatus at a velocity that does not exceed a pre-defined threshold, increasing the volume of the music player application.

23. The method as claimed in claim 21, comprising:
    for a case the predetermined time-varying modulation is caused by the gesture moving towards a face of the apparatus at a velocity that exceeds a pre-defined threshold, muting the volume of the music player application, and
    for a case the predetermined time-varying modulation is caused by the gesture moving away from a face of the apparatus at a velocity that exceeds a pre-defined threshold, exiting the music player application.

\* \* \* \* \*